(12) United States Patent
Smith et al.

(10) Patent No.: US 7,715,553 B2
(45) Date of Patent: May 11, 2010

(54) ENCRYPTING A PLAINTEXT MESSAGE WITH AUTHENTICATION

(75) Inventors: Eric Myron Smith, Dallas, TX (US); Kevin Martin Henson, Garland, TX (US); Daniel Jason Williams, Plano, TX (US); Peter Schweitzer, Watertown, MA (US)

(73) Assignee: Durward D. Dupre, Plano, TX (US)

( * ) Notice: Subject to any disclaimer, the term of this patent is extended or adjusted under 35 U.S.C. 154(b) by 592 days.

(21) Appl. No.: 11/496,214

(22) Filed: Jul. 31, 2006

(65) Prior Publication Data

US 2008/0025496 A1 Jan. 31, 2008

Related U.S. Application Data

(60) Provisional application No. 60/595,720, filed on Sep. 13, 2005.

(51) Int. Cl.
*H04K 1/00* (2006.01)
(52) U.S. Cl. ............................ 380/29; 380/37; 380/268; 713/181
(58) Field of Classification Search ................... 380/29, 380/37, 268; 713/181
See application file for complete search history.

(56) References Cited

U.S. PATENT DOCUMENTS

| 6,128,737 A | 10/2000 | Jakubowski et al. | |
|---|---|---|---|
| 6,226,742 B1 * | 5/2001 | Jakubowski et al. | ........ 713/170 |
| 6,542,607 B1 * | 4/2003 | Euchner et al. | ............... 380/37 |
| 6,570,988 B1 | 5/2003 | Venkatesan et al. | |
| 6,963,976 B1 * | 11/2005 | Jutla | .......................... 713/181 |
| 6,973,187 B2 * | 12/2005 | Gligor et al. | ................... 380/28 |
| 7,046,802 B2 * | 5/2006 | Rogaway | ...................... 380/37 |
| 7,200,227 B2 * | 4/2007 | Rogaway | ...................... 380/37 |
| 2001/0021253 A1 * | 9/2001 | Furuya et al. | ............... 380/259 |
| 2003/0158812 A1 | 8/2003 | Engelhart | |
| 2004/0193513 A1 | 9/2004 | Pruss et al. | |
| 2005/0091075 A1 | 4/2005 | Cohen et al. | |
| 2005/0107066 A1 | 5/2005 | Erskine et al. | |
| 2005/0182711 A1 | 8/2005 | Pulkkinen et al. | |
| 2006/0056623 A1 * | 3/2006 | Gligor et al. | ................... 380/28 |

* cited by examiner

*Primary Examiner*—Emmanuel L Moise
*Assistant Examiner*—Paul Callahan
(74) *Attorney, Agent, or Firm*—Dowell & Dowell PC

(57) ABSTRACT

An encryption and authentication technique that achieves enhanced integrity verification through assured error-propagation using a multistage sequence of pseudorandom permutations. The present invention generates intermediate data-dependent cryptographic variables at each stage, which are systematically combined into feedback loops. The encryption technique also generates an authentication tag without any further steps that is N times longer than the block size where N is the number of pseudorandom permutations used in the encipherment of each block. The authentication tag provides a unique mapping to the plaintext for any number of plaintext blocks that is less than or equal to N. In addition to being a stand alone encryption algorithm, the disclosed technique is applicable to any mode that uses pseudorandom permutations such as, key dependent lookup tables, S-Boxes, and block ciphers such as RC5, TEA, and AES.

26 Claims, 11 Drawing Sheets

ENCRYPTING A PLAINTEXT MESSAGE WITH AUTHENTICATION

CROSS REFERENCE TO RELATED APPLICATIONS

The present invention claims priority from U.S. provisional patent application No. 60/595,720, filed on Sep. 13, 2005, the entire contents of which are incorporated by reference herein.

FIELD OF THE INVENTION

The present invention relates generally to the technical field of data communication and storage. Specifically, the invention relates to cryptographic methods and systems that allow for both the encryption and authentication of information through the use of a generic pseudorandom permutation.

BACKGROUND OF THE INVENTION

Data encryption methods provide privacy of the encrypted information over insecure communication channels. Encryption methods alone, however, lack manipulation detection abilities to ensure the integrity or authenticity of the information. Data authentication methods are required to detect when the received message was altered by an adversary during communication.

Many known algorithms provide authentication separate from privacy. One of the most well known methods for providing data authentication generates an authentication tag or Message Authentication Code (MAC) through the use of a key-dependent one-way hash function. A one-way hash function is designed such that it is comparatively easy to compute but almost impossible to reverse. Because the length of the authentication tag is usually fixed and shorter than the length of the initial message, the authentication tag cannot ensure a one-to-one mapping of messages to authentication tags. The length of the authentication tag, however, is designed to be long enough to thwart brute force attacks.

In the method for exchanging a message with an authentication tag, the sender initiates the exchange by generating an authentication tag from the authentic message using a shared key. The sender then transfers the message and authentication tag to the receiver. At the receiving end, the receiver must generate an authentication tag from the received message using the shared key as well. The receiver then compares his or her generated authentication tag with the received authentication tag. If the two tags match, then the receiver can be assured that the message has not been modified during transmission and that it was sent by someone who knows the secret key.

The use of an authentication tag or MAC consumes time on the receiving end, because it requires the receiver to generate a MAC for comparison. When combined with a data encryption method, the receiver must decrypt the message and generate an authentication tag before the received information can be used. This conventional approach requires two passes over the same message on both the sending and receiving end often with the same basic algorithm. Furthermore, this conventional approach often requires the use of separate keys for each function. The use of two separate functions uses excessive processing power, memory, and time.

In applications focused on minimizing latency such as Supervisory Control and Data Acquisition (SCADA) networks, Remote Frequency Identification (RFID), and other real-time data exchange systems, received information must be used immediately making it impossible to use a separate MAC for data authentication. The devices used in such applications present further restrictions on processing power, code space, and memory. These applications highlight the need for methods that provide message integrity integrated with strong cryptographic privacy to minimize the latency and overhead imposed by separate conventional methods.

In response to the disadvantages of the conventional approaches, various methods have been suggested. Based on a new proof in error detection, the SCADA community including the AGA12 committee suggested assured error-propagation as a means for providing integrity without the need for a traditional MAC. Various methods exist that include error-propagation to provide some level of integrity. Depending on the level of error-propagation, a one-bit modification to the transmitted ciphertext results in some amount of randomization of subsequent bits in order to provide enhanced manipulation detection. One such method, Propagating Cipher Block Chaining (PCBC) was designed to fully propagate a one-bit modification to all subsequent bits. Since its design, however, PCBC mode has been found to be vulnerable to some straight-forward attacks. For example, switching two ciphertext blocks leaves the rest of the message unchanged.

Andrew Wright et al. recently proposed another solution, AES PE-mode for use in SCADA networks that was designed based on the error detection proof to assure at least six bits of randomization following a one-bit manipulation (viz., A. K. Wright, J. A. Kinast, and J. McCarty. Low-Latency Cryptographic Protection for SCADA Communications. In: Proc. 2nd Int. Conf. on Applied Cryptography and Network Security, ACNS 2004). While PE-mode lacks the straight-forward vulnerabilities of PCBC, PE-mode imposes a great deal of latency and overhead, because it is essentially a cascade cipher of two AES encryption modes. In addition to encrypting the message twice, PE-mode is designed to be used with a separate message authentication algorithm such as a CBC-MAC. The drawbacks of PCBC and PE-mode illuminate the need for an error-propagating encryption algorithm that is both fast and small and does not require further steps to achieve integrity.

SUMMARY

The defined invention provides methods and systems for efficiently integrating integrity and strong encryption through assured error-propagation and an automatically generated authentication tag. The present invention is designed to work with considerably low levels of needed code space, processing resources, memory, and latency requirements. Briefly, the present invention consists of a multi-stage encryption system, wherein a plaintext chunk is passed through a sequence of pseudorandom permutations. The system generates intermediate data-dependent cryptographic variables at each stage, which are systematically combined into feedback loops to produce assured error-propagation. At the conclusion of encryption, the invention generates a cryptographic hash using the final data-dependent cryptographic variables.

The invention in question can be implemented in numerous ways including as a method, a system, a process, a device, a stand-alone cryptographic algorithm, or a mode of an existing cryptographic algorithm. Several inventive embodiments of the present invention are described below.

In one embodiment of the present invention, a method for multi-stage data encryption and authentication is defined wherein each stage is a pseudorandom permutation. The method comprises the steps of: receiving plaintext data, partitioning the plaintext into equal size plaintext blocks, passing the each plaintext block through a sequence of pseudorandom permutations, modifying the states of the pseudorandom permutations for the next block based on each current block's intermediate stage cryptographic variables each of which is the output of one stage in the sequence, and generating ciphertext from the output of each plaintext block's final stage. It should be noted that pseudorandom permutations are usually considered stateless. The present invention creates what will be referred to as states by storing variables that are used to modify the input to each pseudorandom permutation. Since the state of these variables directly affects the output of each pseudorandom permutation, the permutations can be seen as having states.

In one further aspect of the present invention, the implementation of each pseudorandom permutation can be achieved by one or multiple of the following: generating shifted permutation tables also known as S-Boxes, using existing cryptographic algorithms, including but not limited to AES, RC5, TEA, IDEA, TWOFISH, or electronically implementing classical rotors.

In one further aspect of the present invention, the modification of the states of each pseudorandom permutation is accomplished by following the pattern which will be referred to as the "312 rule". The pattern outlines the following steps:
  a. The state of the first pseudorandom permutation is modified by the output of the next to the last pseudorandom permutation.
  b. The states of the middle pseudorandom permutations are modified by the output of previous pseudorandom permutation.
  c. The state of the last pseudorandom permutation is modified by both the state and output of the first pseudorandom permutation.

In one further aspect of the present invention, the method generates an authentication tag using the final plaintext block's state variables. The generation of the authentication tag is accomplished by either concatenating the final state variables or masking the final state variables by combining them with the initial permutation states before concatenation.

In one further aspect of the present invention, the method includes the step of initializing the beginning state variables. The initialization process is conducted by encrypting an nonce using a non-initialized version of the defined method and using the generated ciphertext and authentication tag as the beginning variables.

In one further aspect of the present invention, an internal counter is used to further modify the states of the pseudorandom permutations. The addition of a counter, designed to eliminate short cycles, is performed by storing a N counter variables where N is the number of pseudorandom permutation stages, incrementing the counter variables in an odometric fashion, and modifying each pseudorandom permutation state by the associated counter variable.

In one further aspect of the present invention, the number of needed pseudorandom permutations is reduced by substituting the inverse of pseudorandom permutations in use for some number of other pseudorandom permutations. For example, in a 4-stage method with pseudorandom permutations ABCD, the number of pseudorandom permutations required could be reduced by using the permutations $ABA^{-1}B^{-1}$ where $A^{-1}$ and $B^{-1}$ are the inverses of A and B respectively.

In one further aspect of the present invention, the number of needed pseudorandom permutations can be reduced on one side of the communications channel by supplying only pseudorandom permutations on one side while the other side has both pseudorandom and inverse pseudorandom permutations. For example the server side can have both ABCD and $A^{-1}B^{-1}C^{-1}D^{-1}$ permutations while the client side can have only ABCD permutations. Communication from the server to the client is accomplished by first decrypting the plaintext message (has the same effect as encrypting). The client can then recover the message by encrypting the ciphertext (has the same effect as decrypting). Communication from the client to the server is done in the normal fashion i.e. client encrypts message, server decrypts message.

In one further embodiment of the present invention, a data decryption method that is the inverse of the multi-stage data encryption and authentication method is defined. The method comprises the steps of: receiving ciphertext data, partitioning the ciphertext into equal size ciphertext blocks, passing each block through a sequence of pseudorandom permutations where each permutation is an inverse of the permutations used in the encryption method, modifying the states of the pseudorandom permutations for the next block based on each current block's intermediate stage cryptographic variables, and generating plaintext from the output of each ciphertext block's final stage. The decryption method passes each ciphertext block backwards through the sequence in the encryption method. It should be noted that the chosen embodiment of the decryption method should match those in the chosen embodiment of the encryption method. For example, if the chosen embodiment of the encryption method uses RC5 as the pseudorandom permutation, generates an authentication tag, and utilizes counters, the chosen embodiment of the decryption method should also use RC5, generate an authentication tag, and use counters.

In one further embodiment of the present invention, a method for performing an integrity check is defined. The method consists of the steps of: performing the encryption method defined in order to generate ciphertext and an authentication tag, performing the decryption method defined on said ciphertext in order to generate plaintext and a second authentication tag, and comparing the two authentication tags for equality. It can be assured with high probability that the ciphertext was not modified after encryption if the two authentication tags are equal.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE PREFERRED EMBODIMENT

Figure 1:
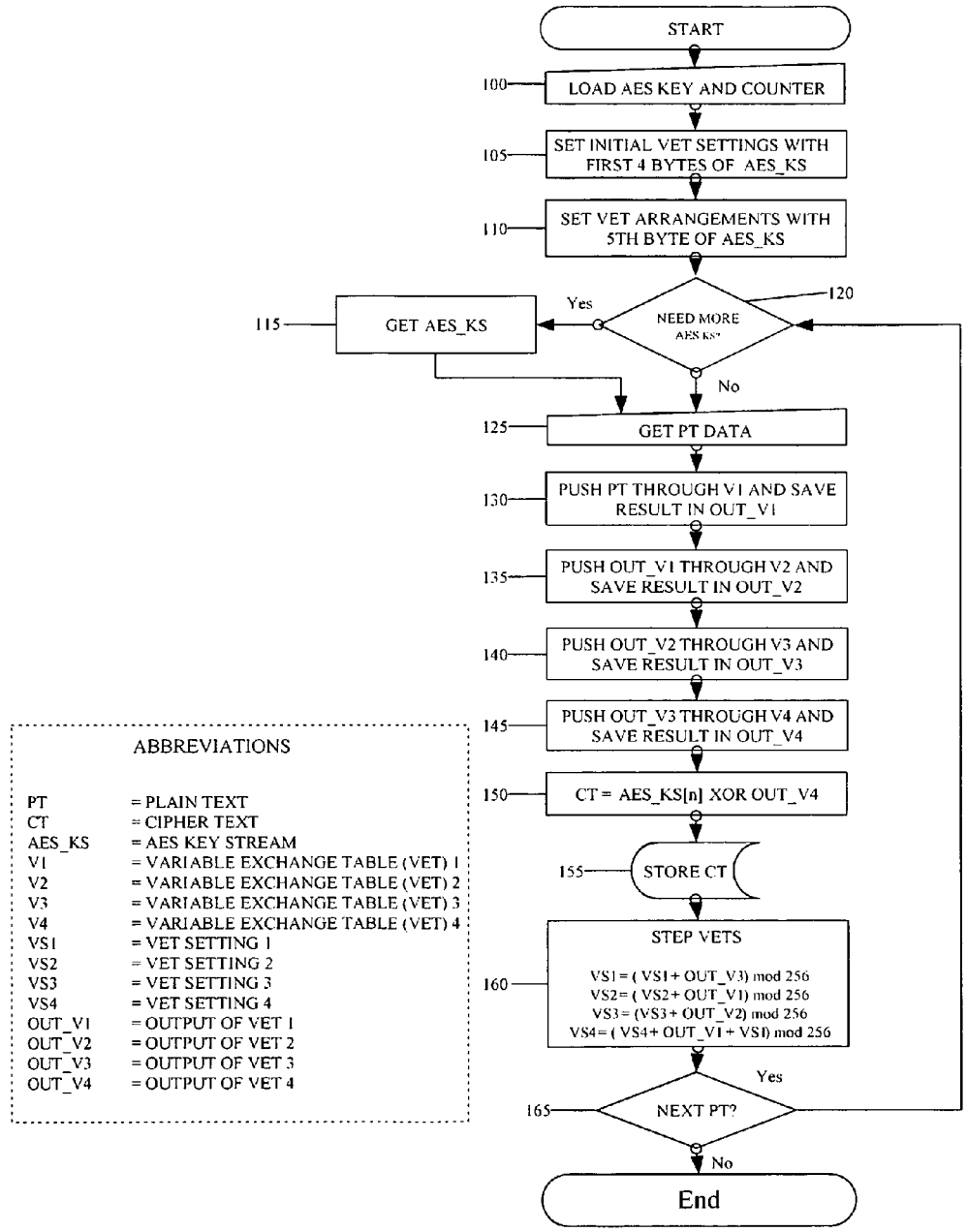
FIG. 1 is a first flowchart in accordance with a preferred embodiment of the present invention.
Figure 2:
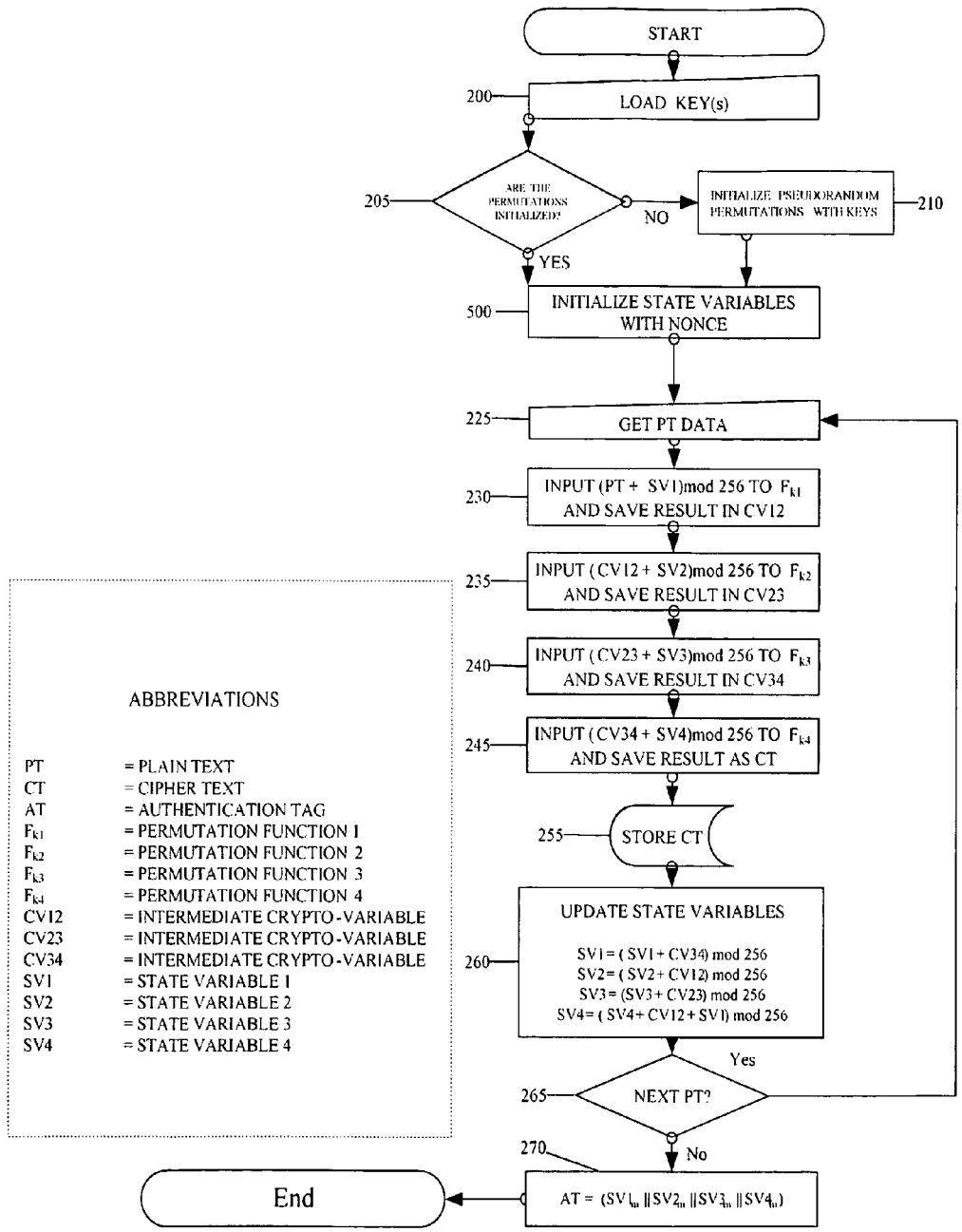
FIG. 2 is a second flowchart in accordance with a preferred embodiment of the present invention.

FIGS. 1 and 2 represent two versions of the flow chart explaining the steps of encryption for the present invention. FIG. 1 was the original diagram as can be found in the provisional patent of the present invention. While maintaining the essential core of the invention, FIG. 2 is the revised encryption diagram with a more clear representation and the elimination of unneeded steps. Before explaining the details of the revised diagram, it is good to note the difference between the two diagrams.

The original diagram uses the term Variable Exchange Table (VET) which is now referred to as the more generally used and understood term, pseudorandom permutation. Furthermore, what was originally denoted as a VET Setting (VS) is now referred to as a state variable (SV), and the Output of a VET is now referred to as an intermediate cryptographic variable (CV). The terms have been modified for ease of understanding.

FIG. 1 contains all of the same steps as the revised diagram except the generation of the authentication tag 270 and the initialization of the state variables 500. At the time of submission of the provisional patent, the cryptographic strength of the present invention was still undetermined. In order to compensate for the uncertainty, additional steps 115, 120, and 150 were added to the encryption method to facilitate the combination of the output of the final pseudorandom permutation with an AES keystream through an exclusive or (XOR) function to produce ciphertext. Said additional steps were thought to further protect the ciphertext from attacks. Further consideration and evaluation have eliminated the need for said additional steps, and therefore they have been removed from the revised diagram. Note that corresponding steps in the two diagrams have been numbered the same (ex 125 corresponds to 225).

FIG. 2 illustrates the steps involved in an encryption embodiment of the present invention. From the start, a key and counter are loaded 200 in order to initialize the pseudorandom permutations if necessary 205 and 210. The next step initializes the state variables and counters with an nonce 500 which is described in further detail in FIG. 5. Once the plaintext is acquired 225, the first plaintext block is combined with the initialized state variables and stepped through a series of four pseudorandom permutations 230-245 resulting in the first ciphertext block 255. Before the next plaintext block can be encrypted, the state variables are updated using the intermediate cryptographic variables 260. This cycle continues 265 and 225 for all plaintext blocks. Optionally, the final state variables can be combined to form an authentication tag 270. The details of the embodied encryption method are described to a greater extent in the next diagram.

Figure 3:
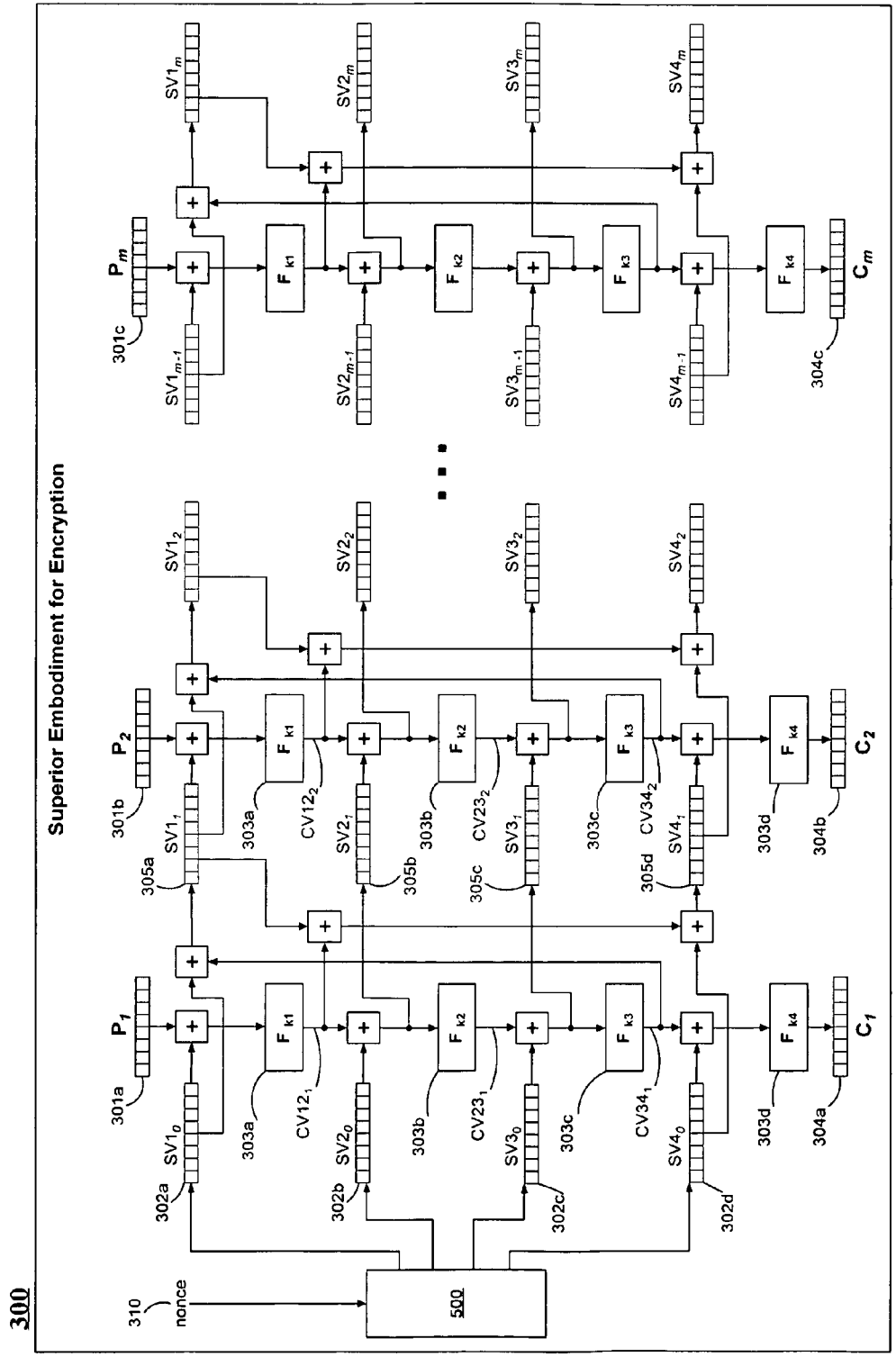
FIG. 3 illustrates an encryption system in accordance with a preferred embodiment of the present invention.

FIG. 3 represents an encryption embodiment of the present invention wherein m plaintext blocks $P_i$ 301 are each passed through a sequence of four pseudorandom permutations 303 resulting in m ciphertext blocks 304. In this embodiment each of the four permutations 303 are keyed with different keys k1, k2, k3, and k4. The embodied method includes the step of initializing the state variables 302 by passing an nonce 310 through a randomization function 500 that is discussed in detail below. Once the state variables are initialized, the first plaintext block $P_1$ 301a is combined with the initial state variable $SV1_0$ 302a through modular $2^n$ addition where n is the size of a plaintext block. The result of said combination is passed into the first pseudorandom permutation $F_{k1}$ 303a producing an intermediate cryptographic variable $CV12_1$ (the cryptographic variable between the first pseudorandom permutation $Fk_1$ 303a and the second $Fk_2$ 303b) which will be fed forward to encrypt the next plaintext block $P_2$ 301b. Continuing with the encryption of $P_1$ 301a, $CV12_1$ is combined with the second initialized state variable $SV2_0$ 302b through modular $2^n$ addition and passed into the second pseudorandom permutation $F_{k2}$ 303b resulting in $CV23_1$. The encryption continues to follow the same pattern for the two remaining pseudorandom permutations $F_{k3}$ 303c and $F_{k4}$ 303d where the result of $F_{k4}$ 303d is the first ciphertext block $C_1$ 304a.

For the encryption of the next plaintext block $P_2$ 301b, the state variables 305 must be updated using a feedback mechanism as will be described. The first state variable $SV1_1$ 305a produced following the encryption of the first plaintext block $P_1$ 301a is generated by combining the previous state variable $SV1_0$ 302a with the output from the previous block's third permutation $CV34_1$ through modular $2^n$ addition where n is the size of a plaintext block. The second state variable $SV2_1$ 305b is generated by combining the previous state variable $SV2_0$ 302b with the output from the previous block's first permutation $CV12_1$ through modular $2^n$ addition. Similarly, the third state variable $SV3_1$ 305c is generated by combining the previous state variable $SV3_0$ 302c with the output from the previous block's second permutation $CV23_1$ through modular $2^n$ addition. The fourth state variable $SV4_1$ 305d is generated by combining the previous state variable $SV4_0$ 302d with the output from the previous block's first permutation $CV12_1$ and the current block's first state variable $SV_1$ 305a, through modular $2^n$ addition. It should be noted that the calculation of $SV_1$ 305a should occur before the calculation of $SV4_1$ 305d. Furthermore, while the described embodiment of the present invention stores the state variables SV1, SV2, SV3, and SV4, derived embodiments could entail the same spirit of the present embodiments without actually storing the state variables. The step of storing state variables is disclosed in the present invention for ease of understanding.

The encryption of all further plaintext blocks $P_2$ 301b through $P_m$ 301c are conducted in the same manner as the encryption of $P_1$ 301a. For example, the second plaintext block $P_2$ 301b is conducted in the same manner as the encryption of the first plaintext block $P_1$ 301a substituting the updated state variables 305 for the previous state variables 302.

Figure 4:
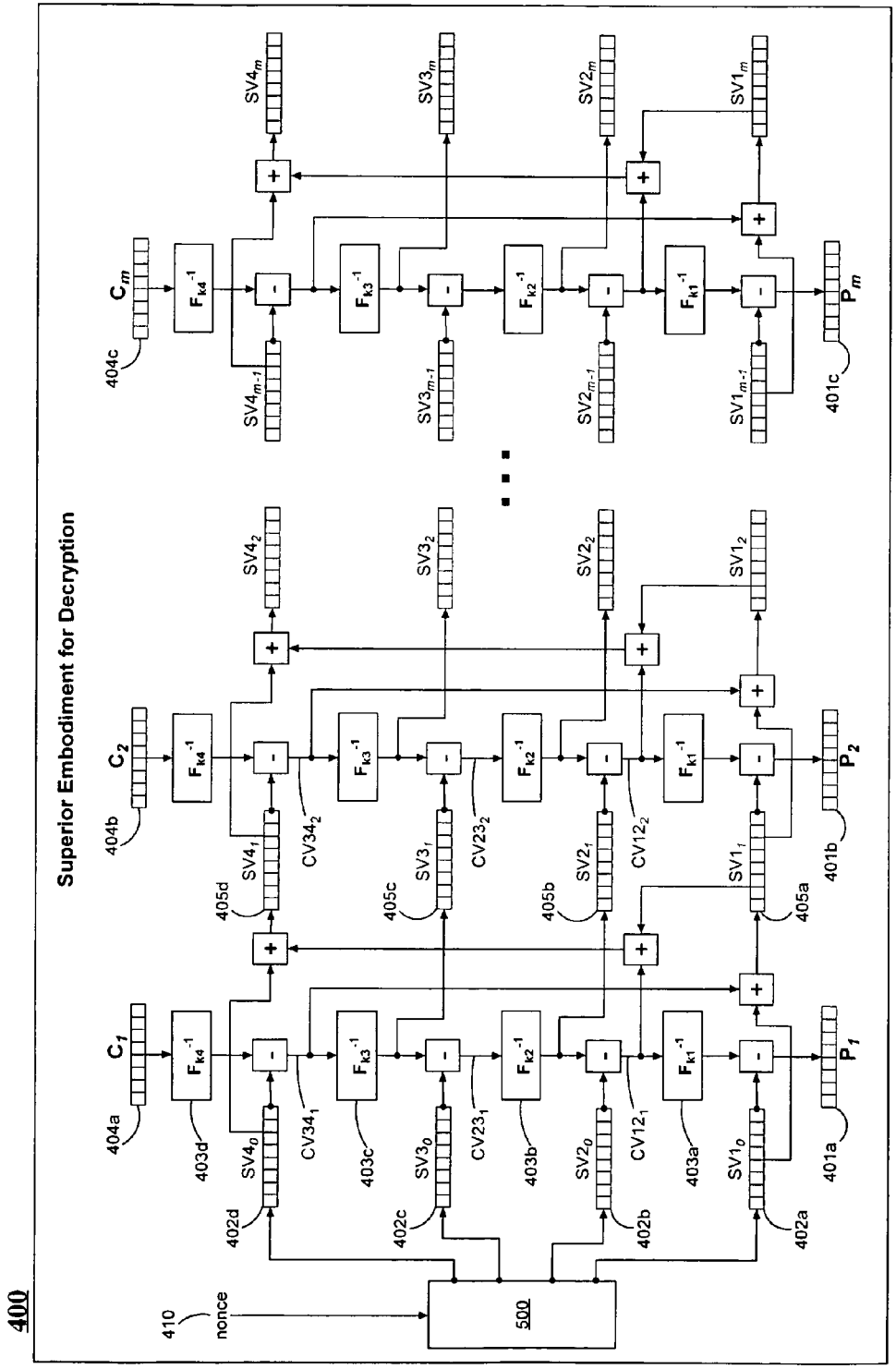
FIG. 4 illustrates a decryption system in accordance with a preferred embodiment of the present invention.

FIG. 4 represents a decryption embodiment of the present invention wherein m ciphertext blocks $C_i$ 404 are each passed through a sequence of four inverse pseudorandom permutations $F_K^{-1}$ 403 resulting in m plaintext blocks $P_i$ 401. In this embodiment each of the four inverse permutations $F_K^{-1}$ 403 are keyed with the same keys used in the encryption in FIG. 3. The embodied method includes the step of initializing the state variables 402 by passing an nonce 410 through a randomization function 500 that is discussed in detail below. Once the state variables 402 are initialized, the first ciphertext block $C_1$ 404a is passed into the first inverse pseudorandom permutation $F_{k4}^{-1}$ 403d. The result of said inverse pseudorandom permutation $F_{k4}^{-1}$ 403d is combined with the initial state variable SV4$_0$ 402d through modular $2^n$ subtraction where n is the size of a ciphertext block producing an intermediate cryptographic variable CV34$_1$ (the cryptographic variable between F$_{k3}$$^{-1}$ 403c and F$_{k4}$$^{-1}$ 403d) which will be fed forward to decrypt the next ciphertext block C$_2$ 404b. Continuing with the decryption of C$_1$ 404a, CV34$_1$ is passed into the second inverse psuedorandoranum permutation F$_{k3}$$^{-1}$ 403c. The result of said inverse permutation F$_{k3}$$^{-1}$ 403c is combined with SV3$_0$ using modular $2^n$ subtraction producing CV23$_1$. The decryption continues to follow the same pattern for the two remaining inverse pseudorandom permutations F$_{k2}$$^{-1}$ 403b and F$_{k1}$$^{-1}$ 403a where the result of F$_{k1}$$^{-1}$ 403a is combined with SV1$_0$ 402a using modular $2^n$ subtraction to produce the first plaintext block P$_1$ 401a.

For the decryption of the next ciphertext block C$_2$ 404b, the state variables 405 must be updated using a feedback mechanism as will be described. The state variable SV1$_1$ 405a, produced following the decryption of the first ciphertext block C$_1$ 404a, is generated by combining the previous state variable SV1$_0$ 402a with the input from the previous block's second inverse permutation CV34$_1$ through modular $2^n$ addition where n is the size of a ciphertext block. The second state variable SV2$_1$ 405b is the output of the previous block's third inverse permutation F$_{k2}$$^{-1}$ 403b. Similarly, the state variable SV3$_1$ 405c is the output of the previous block's second inverse permutation F$_{k3}$$^{-1}$ 403c. The state variable SV4$_1$ 405d is generated by combining the previous state variable SV4$_0$ 402d with the input from the previous block's fourth inverse permutation CV12$_1$ and the current block's state variable SV1$_1$ 405a, through modular $2^n$ addition. It should be noted that the calculation of SV1$_1$ 405a should occur before the calculation of SV4$_1$ 405d. Furthermore, while the described embodiment of the present invention stores the state variables SV1, SV2, SV3, and SV4, derived embodiments could entail the same spirit of the present embodiments without actually storing the state variables. The step of storing state variables is disclosed in the present invention for ease of understanding.

The decryption of all further ciphertext blocks C$_2$ 404b through C$_m$ 404c are conducted in the same manner as the decryption of C$_1$ 404a. For example, the second ciphertext block C$_2$ 404b is conducted in the same manner as the decryption of the first ciphertext block C$_1$ 404a substituting the updated state variables 405 for the previous state variables 402.

Figure 5:
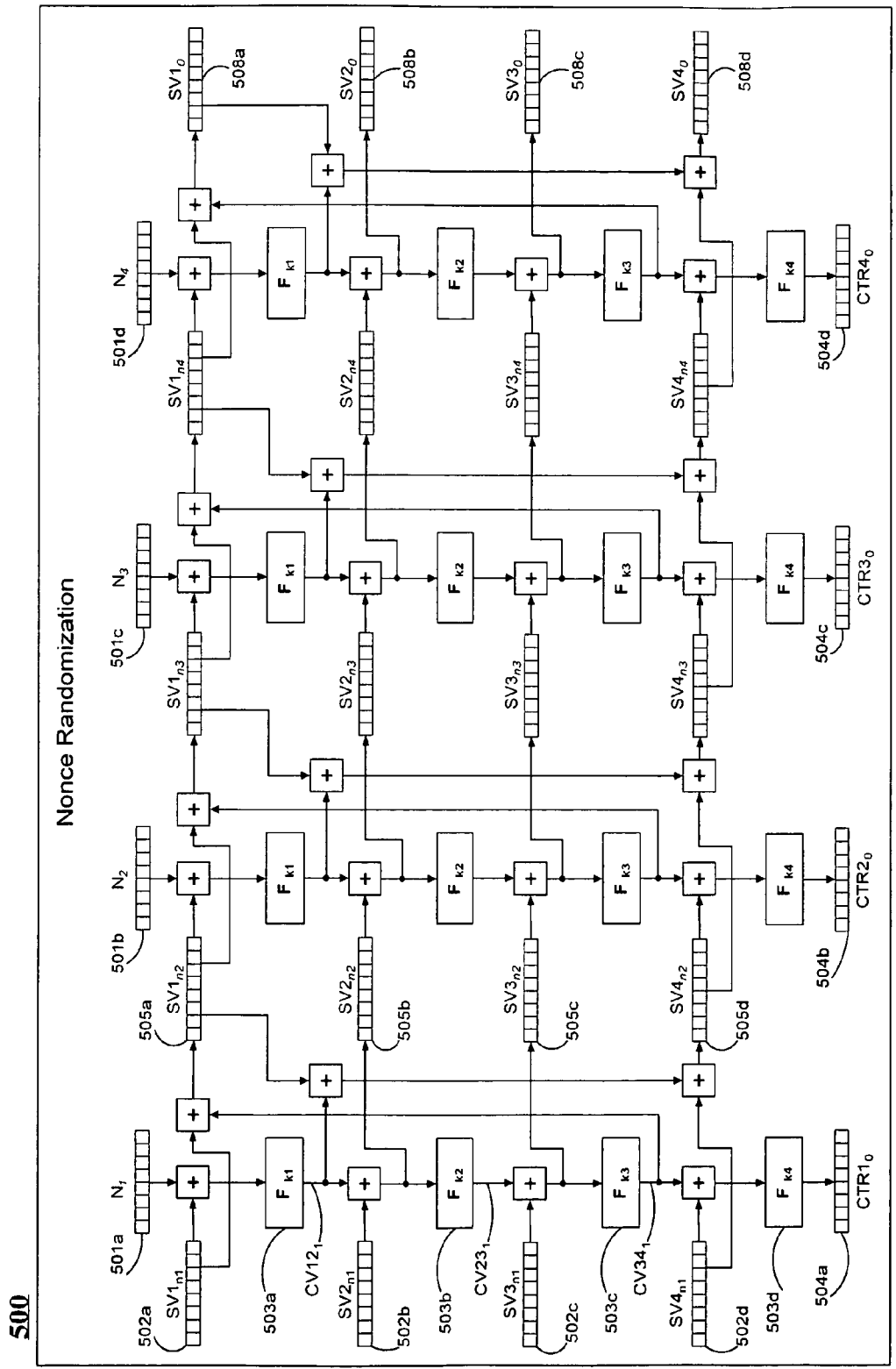
FIG. 5 illustrates initializing variables using a nonce in accordance with a preferred embodiment of the present invention.

FIG. 5 illustrates the function of generating initial values by randomizing a nonce as used in FIGS. 3, 4, 9, and 10. The purpose said function is to initialize the state variables and counters to unique and unpredictable values. The nonce or input to the function may be a random number, an incrementing counter, or any value as long as it has not been used before in the context of a given key(s). It should be noted that the nonce need not be secret. The initialization function parses a unique value into m blocks N$_i$ 501 and passes each block through a sequence of m pseudorandom permutations 503 resulting in values that are used in the initial setup of both the encryption and decryption methods. Padding may be necessary in order to facilitate equal sized blocks. The number of blocks m and the number of pseudorandom permutations m must always be the same. In the present embodiment of the initialization function, m is equal to 4. The randomization function keys each of the four permutations F$_K$ 503 with different keys k1, k2, k3, and k4. The embodied method includes the step of initializing the state variables 502 to a constant such as zero. Once the state variables 502 are initialized, the first block N$_1$ 501a is combined with the initial state variable SV1$_{n1}$ 502a through modular $2^n$ addition where n is the size of a block. The result of said combination is passed into the first pseudorandom permutation F$_{k1}$ 503a producing an intermediate cryptographic variable CV12$_1$ (the cryptographic variable between the first pseudorandom permutation F$_{k1}$ 503a and the second F$_{k2}$ 503b) which will be fed forward to encrypt the next block N$_2$ 501b. Continuing with the randomization function of N$_1$ 501a, CV12$_1$ is combined with the second initialized state variable SV2$_{n1}$ 502b through modular $2^n$ addition and passed into the second pseudorandom permutation F$_{k2}$ 503b resulting in CV23$_1$. The randomization continues to follow the same pattern for the two remaining pseudorandom permutations F$_{k3}$ 503c and F$_{k4}$ 503d where the result of F$_{k4}$ 503d is the first CTR value CTR1$_0$ 504a. It should be noted that some embodiments may not use the generated CTR 504 values.

For the next block N$_2$ 501b, the state variables 505 must be updated using a feedback mechanism as will be described. The first state variable SV1$_{n2}$ 505a produced following the randomization of the first block N$_1$ 501a is generated by combining the previous state variable SV1$_{n1}$ 502a with the output from the previous block's third permutation CV34$_1$ through modular $2^n$ addition where n is the size of a block. The second state variable SV2$_{n2}$ 505b is generated by combining the previous state variable SV2$_{n1}$ 502b with the output from the previous block's first permutation CV12$_1$ through modular $2^n$ addition. Similarly, the third state variable SV3$_{n2}$ 505c is generated by combining the previous state variable SV3$_{n1}$ 502c with the output from the previous block's second permutation CV23$_1$ through modular $2^n$ addition. The fourth state variable SV4$_{n2}$ 505d is generated by combining the previous state variable SV4$_{n1}$ 502d with the output from the previous block's first permutation CV12$_1$ and the current block's first state variable SV1$_{n2}$ 505a, through modular $2^n$ addition. It should be noted that the calculation of SV1$_{n2}$ 505a should occur before the calculation of SV4$_{n2}$ 505d. Furthermore, while the described embodiment of the present invention stores the state variables SV1, SV2, SV3, and SV4, derived embodiments could entail the same spirit of the present embodiments without actually storing the state variables. The step of storing state variables is disclosed in the present invention for ease of understanding.

The randomization of all further plaintext blocks N$_2$ 501b through N$_4$ 501d are conducted in the same manner as the randomization of N$_1$ 501a. For example, the second plaintext block N$_2$ 501b is conducted in the same manner as the randomization of the first plaintext block N$_1$ 501a substituting the updated state variables 505 for the previous state variables 502. After the four blocks 501 are each randomized, the resulting state variables SV1$_0$, SV2$_0$, SV3$_0$, and SV4$_0$ 508 can be used as initial state variables for FIGS. 3, 4, 9, 10. Similarly, the resulting randomized values, CTR1$_0$, CTR2$_0$, CTR3$_0$, and CTR4$_0$ 504 can be used as initial counters for FIGS. 9,10.

Figure 6:
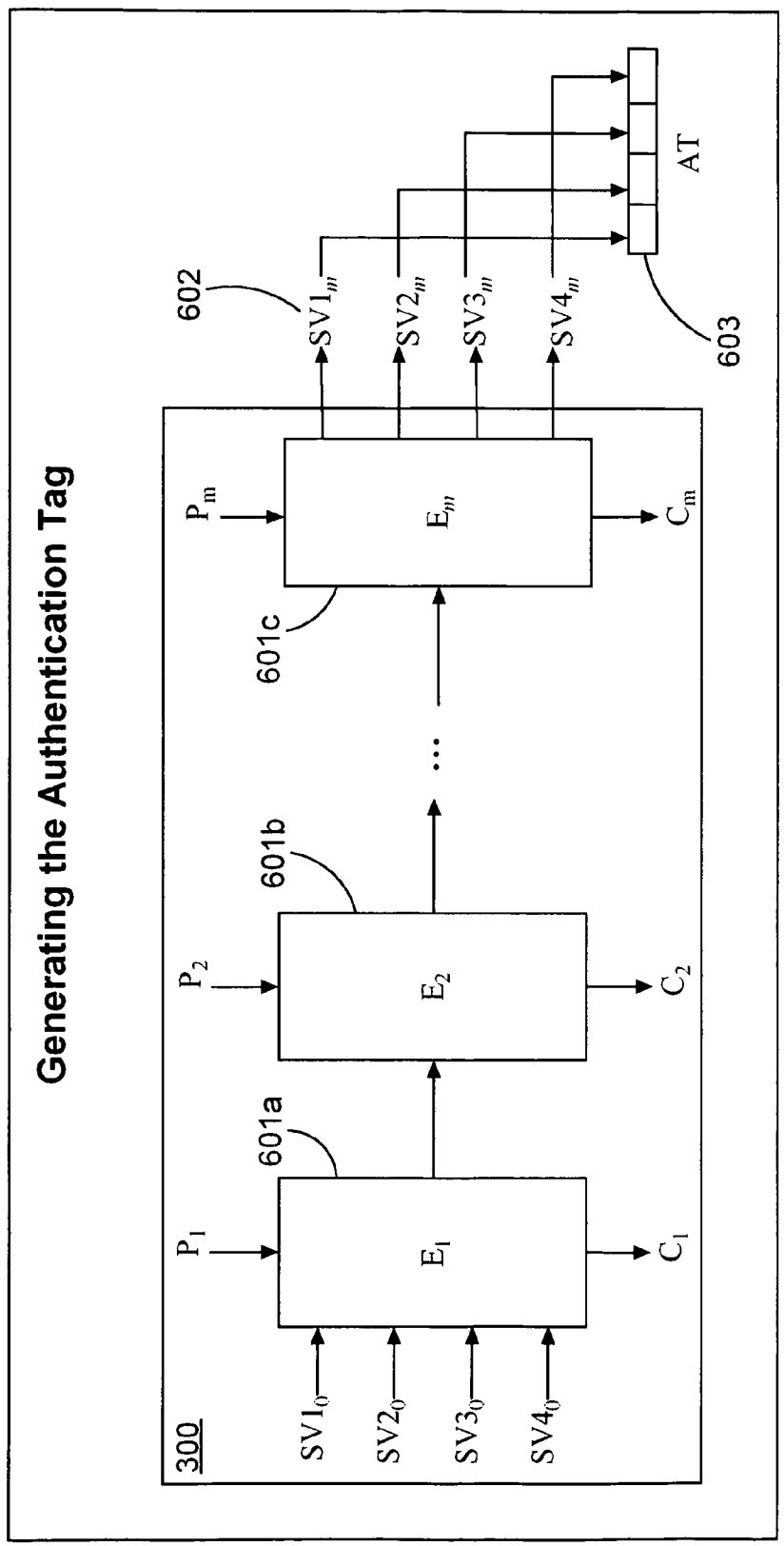
FIG. 6 illustrates generating an authentication tag from final state variables in accordance with a preferred embodiment of the present invention.

FIG. 6 presents an elevated look at the method for generating an authentication tag from the results of the previously described encryption embodiment. The diagram includes an abbreviated version of the encryption method 300 in which each sequence of pseudorandom permutations is depicted in a single encryption function E$_i$ 601. The final encryption function E$_m$ 601c produces four final state variables 602 which are concatenated to form an authentication tag 603. As explained previously, an authentication tag is used to provide an integrity check on encrypted data.

Figure 7:
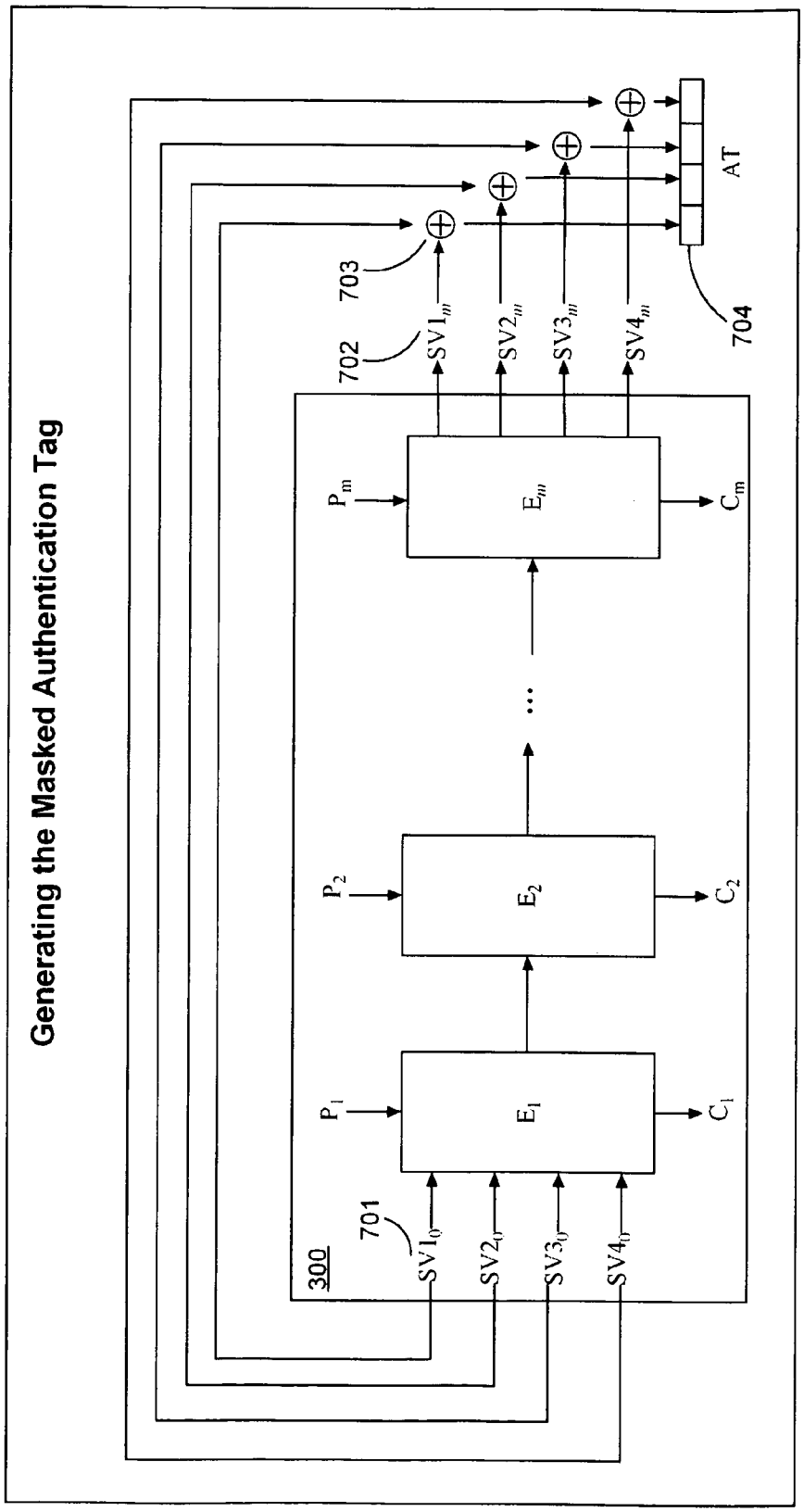
FIG. 7 illustrates generating a masked authentication tag from a combination of the initial and final state variables in accordance with a preferred embodiment of the present invention.

FIG. 7 represents an alternative embodiment of the method for generating an authentication tag from the results of the encryption embodiment. As in FIG. 6, the diagram includes an abbreviated version of the encryption method 300. In this alternative embodiment, each final state variable 702 is combined with its corresponding initial state variable 701 through an XOR function 703 before being concatenated to form the authentication tag 704. This alternative embodiment masks the final state variables from being openly accessible to an attacker and may serve to increase the cryptographic strength of the present invention.

Figure 8:
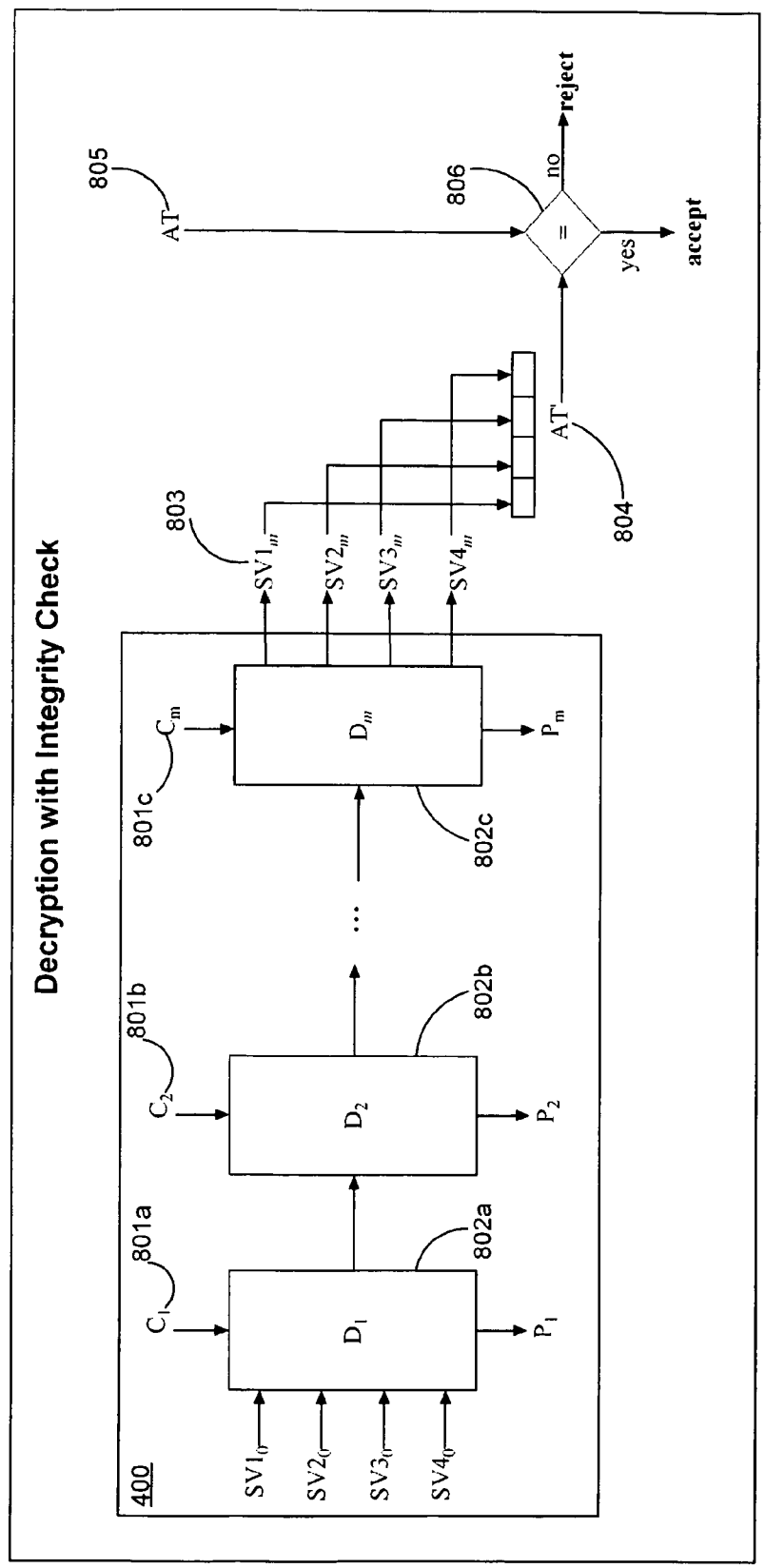
FIG. 8 illustrates decrypting and verifying the integrity of the message using a received authentication tag in accordance with a preferred embodiment of the present invention.

FIG. 8 represents an embodied method for performing an integrity check of a message after decryption. The diagram includes an abbreviated version of the decryption method 400 in which each sequence of inverse pseudorandom permutations is depicted in a single decryption function $D_i$ 802. The received message includes a previously generated authentication tag AT 805 in addition to the ciphertext 801. Said authentication tag was previously generated during encryption as is depicted in FIG. 6. The final decryption function $D_m$ 802c produces four final state variables 803 which are concatenated to form an authentication tag AT' 804. The received authentication tag AT 805 identifies the original message that was encrypted, while the newly generated authentication tag AT' 804 identifies the received message. With the two authentication tags, an integrity check 806 is performed as follows. If the two authentication tags are not equal, the message was modified between its encryption and decryption and should be rejected. Conversely, if the authentication tags are equal, it can be assured with high probability that the message has not been tampered with and can be accepted. It should be noted that an integrity check could also be performed using a previously generated authentication tag as in FIG. 7. The method for generating an authentication tag during decryption would match the encryption method in FIG. 7 followed by an integrity check as in the present figure.

Figure 9:
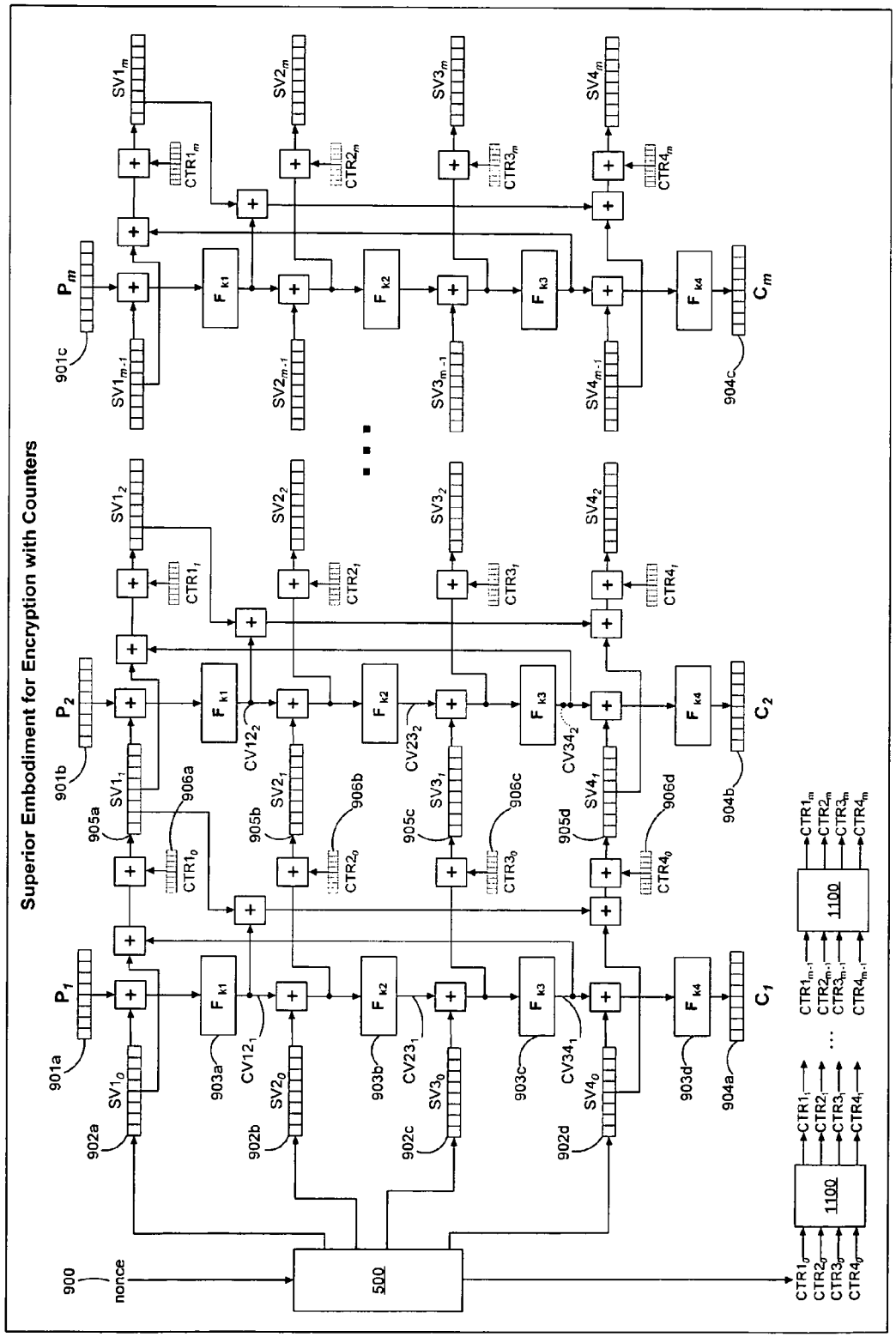
FIG. 9 illustrates the encryption method from FIG. 3 with the addition of counters, in accordance with a preferred embodiment of the present invention.

FIG. 9 represents a further aspect the present invention wherein counters are added. In the same manner as the embodiment in FIG. 3, m plaintext blocks $P_i$ 901 are each passed through a sequence of four pseudorandom permutations $F_k$ 903 resulting in m ciphertext blocks $C_i$ 904. Each of the four permutations $F_k$ 903 are keyed with different keys k1, k2, k3, and k4. The embodied method includes the step of initializing the state variables 902 and counters 906 by passing a nonce 900 through a randomization function 500 that has been previously defined. Once the state variables and counters are initialized, the first plaintext block $P_1$ 301a is combined with the initial state variable $SV1_0$ 902a through modular $2^n$ addition where n is the size of a plaintext block. The result of said combination is passed into the first pseudorandom permutation $F_{k1}$ 903a producing an intermediate cryptographic variable $CV12_1$ (the cryptographic variable between the first pseudorandom permutation $F_{k1}$ 903a and the second $F_{k2}$ 903b) which will be fed forward to encrypt the next plaintext block $P_2$ 901b. Continuing with the encryption of $P_1$ 901a, $CV12_1$ is combined with the second initialized state variable $SV2_0$ 902b through modular $2^n$ addition and passed into the second pseudorandom permutation $F_{k2}$ 903b resulting in $CV23_1$. The encryption continues to follow the same pattern for the two remaining pseudorandom permutations $F_{k3}$ 903c and $F_{k4}$ 903d where the result of $F_{k4}$ 903d is the first ciphertext block $C_1$ 904a.

For the encryption of the next plaintext block $P_2$ 901b, the state variables 905 must be updated using counters and a feedback mechanism as will be described. The first state variable $SV1_1$ 905a produced following the encryption of the first plaintext block $P_1$ 901a is generated by combining the previous state variable $SV1_0$ 902a with the output from the previous block's third permutation $CV34_1$ and a counter $CTR1_0$ 906a through modular $2^n$ addition where n is the size of a plaintext block. The second state variable $SV2_1$ 905b is generated by combining the previous state variable $SV2_0$ 902b with the output from the previous block's first permutation $CV12_1$ and a counter $CTR2_0$ 906b through modular $2^n$ addition. Similarly, the third state variable $SV3_1$ 905c is generated by combining the previous state variable $SV3_0$ 902c with the output from the previous block's second permutation $CV23_1$ and a counter $CTR3_0$ 906c through modular $2^n$ addition. The fourth state variable $SV4_1$ 905d is generated by combining the previous state variable $SV4_0$ 902d with the output from the previous block's first permutation $CV12_1$ and the current block's first state variable $SV1_1$ 905a and a counter $CTR4_0$ 906d through modular $2^n$ addition. The counters 906 are then incremented using function 1100. It should be noted that the calculation of $SV1_1$ 905a should occur before the calculation of $SV4_1$ 905d. Furthermore, while the described embodiment of the present invention stores the state variables SV1, SV2, SV3, and SV4, derived embodiments could entail the same spirit of the present embodiments without actually storing the state variables. The step of storing state variables is disclosed in the present invention for ease of understanding.

The encryption of all further plaintext blocks $P_2$ 901b through $P_m$ 901c are conducted in the same manner as the encryption of $P_1$ 901a. For example, the second plaintext block $P_2$ 901b is conducted in the same manner as the encryption of the first plaintext block $P_1$ 901a substituting the updated state variables 905 for the previous state variables 902.

Figure 10:
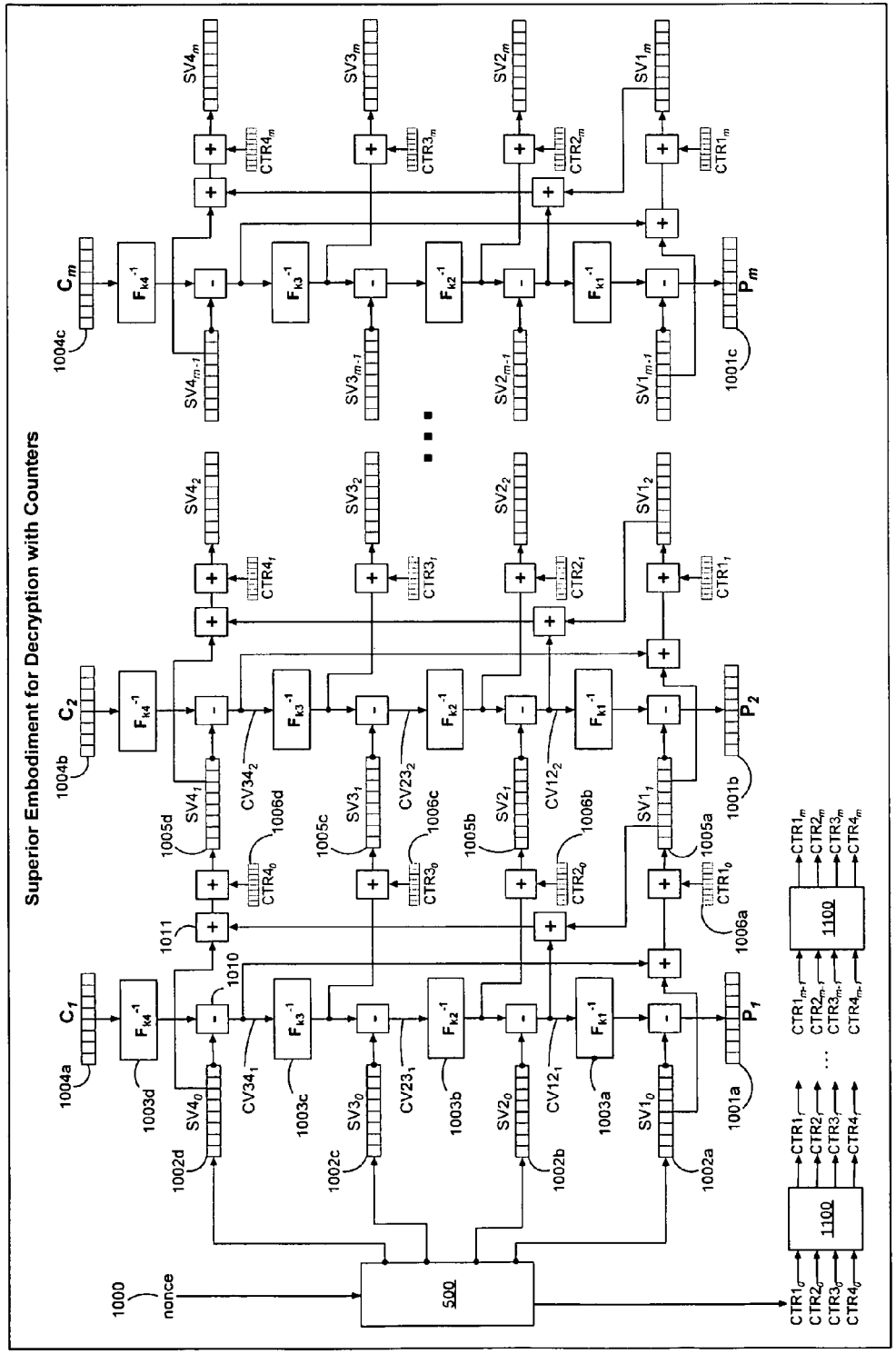
FIG. 10 illustrates the decryption method from FIG. 4 with the addition of counters, in accordance with a preferred embodiment of the present invention.

FIG. 10 represents a decryption embodiment of the present invention wherein m ciphertext blocks $C_i$ 1004 are each passed through a sequence of four inverse pseudorandom permutations 1003 resulting in m plaintext blocks $P_i$ 1001. In this embodiment each of the four inverse permutations 1003 are keyed with the same keys used in the encryption in FIG. 9. The embodied method includes the step of initializing the state variables 1002 and initial counters 1006 by passing a nonce 1000 through a randomization function 500 that has been previously defined. Once the state variables and counters are initialized, the first ciphertext block $C_1$ 1004a is passed into the first inverse pseudorandom permutation $F_{k4}^{-1}$ 1003d. The result of said inverse pseudorandom permutation $F_{k4}^{-1}$ 1003d is combined with the initial state variable $SV4_0$ 1002d through modular $2^n$ subtraction where n is the size of a ciphertext block producing an intermediate cryptographic variable $CV34_1$ (the cryptographic variable between $F_{k3}^{-1}$ 1003c and $F_{k4}^{-1}$ 1003d) which will be fed forward to decrypt the next ciphertext block $C_2$ 1004b. Continuing with the decryption of $C_1$ 1004a, $CV34_1$ is passed into the second inverse psuedorandorandum permutation $F_{k3}^{-1}$ 1003c. The result of said inverse permutation $F_{k3}^{-1}$ 1003c is combined with $SV3_0$ using modular $2^n$ subtraction producing $CV23_1$. The decryption continues to follow the same pattern for the two remaining inverse pseudorandom permutations $F_{k2}^{-1}$ 1003b and $F_{k1}^{-1}$ 1003a where the result of $F_{k1}^{-1}$ 1003a is combined with $SV1_0$ 1002a using modular $2^n$ subtraction to produce the first plaintext block $P_1$ 1001a.

For the decryption of the next ciphertext block $C_2$ 1004b, the state variables 1005 must be updated using a feedback mechanism as will be described. The state variable $SV1_1$ 1005a produced following the decryption of the first ciphertext block $C_1$ 1004a is generated by combining the previous state variable $SV1_0$ 1002a with the input from the previous block's second inverse permutation $CV34_1$ and a counter $CTR1_0$ 1006a through modular $2^n$ addition where n is the size of a ciphertext block. The second state variable $SV2_1$ 1005b is the output from the previous block's third inverse permutation $F_{k2}^{-1}$ 1003b and a counter $CTR2_0$ 1006b through modular $2^n$ addition. Similarly, the state variable $SV3_1$ 1005c is the output from the previous block's second pseudorandom permutation $F_{k3}^{-1}$ 1003c and a counter $CTR3_0$ 1006c through modular $2^n$ addition. The state variable $SV4_1$ 1005d is generated by combining the previous state variable $SV4_0$ 1002d with the input from the previous blocks fourth inverse permutation $CV12_1$ and the current block's state variable $SV_1$ 1005a and a counter $CTR4_0$ 1006a through modular $2^n$ addition. The counters 1006 are then incremented using function 1100. It should be noted that the calculation of $SV1_1$ 1005a should occur before the calculation of $SV4_1$ 1005d. Furthermore, while the described embodiment of the present invention stores the state variables SV1, SV2, SV3, and SV4, derived embodiments could entail the same spirit of the present embodiments without actually storing the state variables. The step of storing state variables is disclosed in the present invention for ease of understanding.

The decryption of all further ciphertext blocks $C_2$ 1004b through $C_m$ 1004c are conducted in the same manner as the decryption of $C_1$ 1004a. For example, the second ciphertext block $C_2$ 1004b is conducted in the same manner as the decryption of the first ciphertext block $C_1$ 1004a substituting the updated state variables 1005 for the previous state variables 1002.

Figure 11:
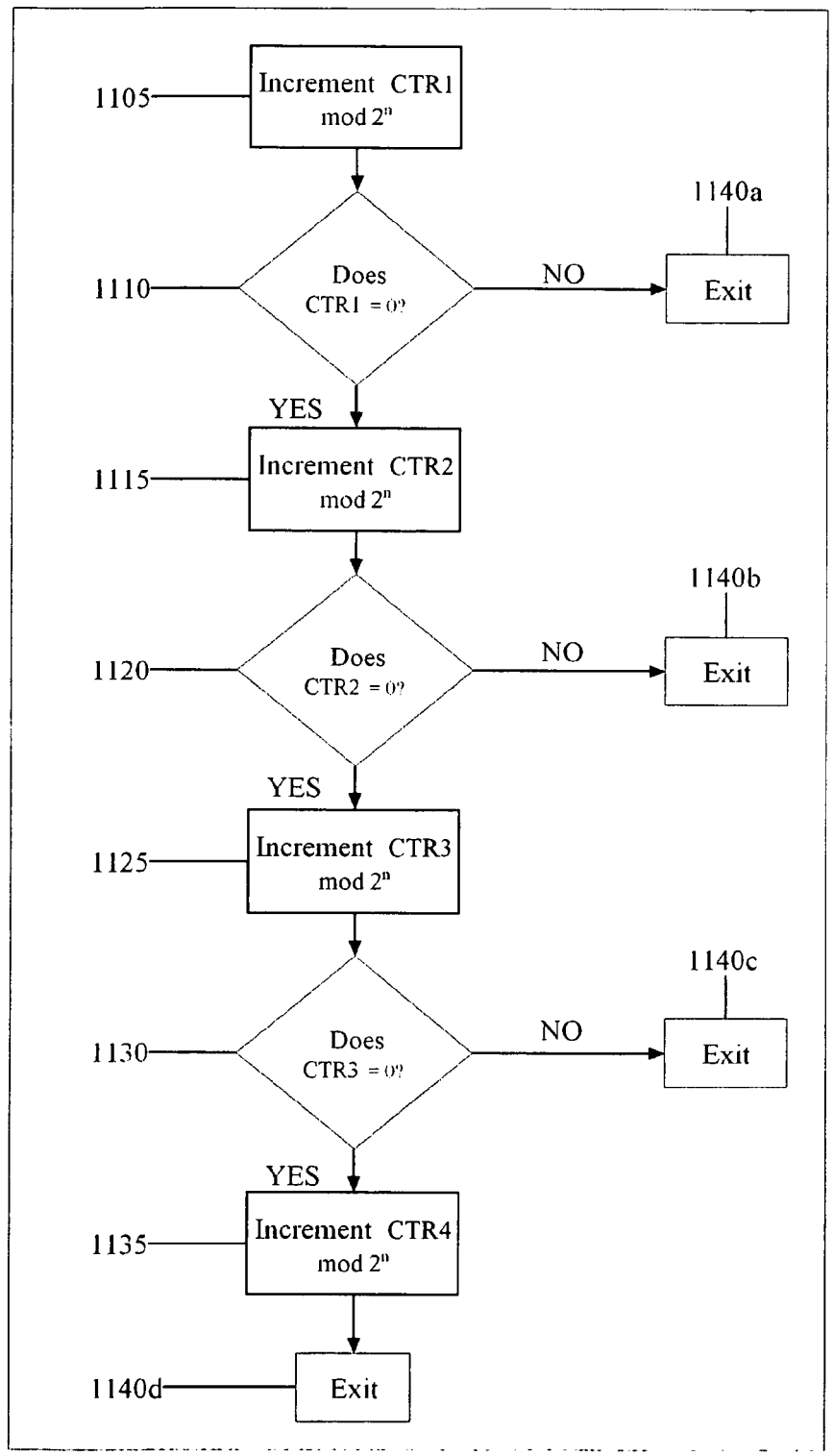
FIG. 11 illustrates incrementing counters in accordance with a preferred embodiment of the present invention.

FIG. 11 represents an embodied method for modifying the counters from one block encipherment to the next. The method takes as input four counters $CTR1_i$ through $CRT4_i$ and produces four counters $CTR1_{i+1}$ through $CRT4_{i+1}$. The steps taken in the embodied method model a typical mileage odometer from an automobile where CTR1 is the lowest order of magnitude and CTR4 is the highest order of magnitude. The embodied method always begins by incrementing the lowest order counter CTR1 1105 through modular $2^n$ addition where n is the size of the counter in bits. If CTR1 has reset itself and is equal to zero 1110, the embodied method continues to increment CTR2 1115 in the same manner as CTR1. If CTR1 is not zero 1110, the method exits 1140a and the resulting counters are stored for use in encrypting or decrypting the next block. Each subsequent counter is incremented in the same manner as long as all lower order counters are equal to zero.

In one embodiment of the present invention, a method for encrypting a plaintext message comprises receiving at least one plaintext message, wherein the plaintext message forms at least one plaintext block, encrypting said plaintext block by applying 2 or more pseudorandom permutations to each block, and modifying an input to each said pseudorandom permutation by at least one state variable which is modified for each plaintext block by at least one of previously generated permutation outputs, previously generated permutation inputs, ciphertext, and plaintext. The method comprises generating at least one ciphertext block from the output of each plaintext block's final pseudorandom permutation, partitioning the plaintext message into a plurality of equal size plaintext blocks, padding the plaintext message to facilitate the equal sized plaintext blocks, wherein the modification of the state variables comprises at least one of: modifying the state variable for a first pseudorandom permutation by an output of a next to the last pseudorandom permutation from the previous block, modifying the state variable for a final permutation by an output of the first pseudorandom permutation from the previous block and the state variable for the first pseudorandom permutation from the current block, and modifying the state variables for all other pseudorandom permutations by an output of the preceding pseudorandom permutation from the previous block, wherein the state variables are modified using at least one of modular $2^n$ addition and modular $2^n$ subtraction wherein n represents the size of a block, and wherein the state variables are modified using a bitwise exclusive or (XOR).

The method comprises initializing the state variables before encrypting the first plaintext block by randomizing a nonce and padding the nonce in order to facilitate the initialization of the state variables, wherein the initialized state variables are unique from other initialized state variables in a context of a session key, wherein the number of pseudorandom permutations determines the number of state variables, wherein the pseudorandom permutations are at least one of: block ciphers, keyed substitution tables, S-Boxes, and rotors, wherein each pseudorandom permutation is keyed by at least one different key, wherein each pseudorandom permutation is keyed by a same key, wherein a portion of the pseudorandom permutations may be substituted for the inverses of a remaining portion of the pseudorandom permutations, and wherein the pseudorandom permutations and inverse pseudorandom permutations may be arranged in any order.

The method comprises generating an authentication tag from a combination of the state variables, wherein the generation consists of concatenating the resulting state variables after the encryption of the final plaintext block, wherein the generation consists of concatenating the resulting state variables after the encryption of a chosen plaintext block, wherein the generation consists of concatenating the resulting state variables after the encryption of the final plaintext block, concatenating the initial state variables, and combining the two sets of concatenated variables through an exclusive or (XOR), comprises attaching the authentication tag to a ciphertext message, wherein the number of state variables determines the size of the authentication tag, and comprises modifying the input to a pseudorandom permutation by at least one counter, and initializing the counters before encrypting the first plaintext block by randomizing a nonce.

In another embodiment of the present invention, an apparatus for encrypting a plaintext message comprises logic to form at least one nonce block from at least one nonce, memory to store at least one state variable, an initializer to set the at least one state variable to at least one initial value, wherein the logic is coupled to the memory and to the initializer, wherein the logic includes at least two pseudorandom permutations to sequentially randomize each nonce block, wherein the logic combines the at least one state variable with inputs to the pseudorandom permutations, and wherein the logic generates the at least one state variable of a current nonce block from at least one of: state variables of a previous nonce block, outputs from the previous nonce block's pseudorandom permutations, and inputs to the previous nonce block's pseudorandom permutations, wherein the memory stores outputs of final pseudorandom permutations as initial values to use in an encryption or decryption, wherein the memory stores final state variables as initial values for use in an encryption or decryption, wherein the logic adds at least one bit of padding to the nonce to generate equal sized nonce blocks, wherein the number of pseudorandom permutations is equal to the number of nonce blocks and the number of state variables, wherein the pseudorandom permutations are at least one of: block ciphers, keyed substitution tables, S-Boxes, and rotors, wherein a portion of the pseudorandom permutations may be substituted for inverses of a remaining portion of the pseudorandom permutations.

In a further embodiment of the present invention, a computer readable medium comprising instructions for: receiving at least one plaintext message, wherein the plaintext message forms at least one plaintext block, encrypting said plaintext block by applying 2 or more pseudorandom permutations to each block, modifying an input to the pseudorandom permutations by at least one state variable, modifying the at least one state variable after each plaintext block is encrypted for use in encrypting a next plaintext block, modifying the at least one state variable for a first pseudorandom permutation by an output of a next to last pseudorandom permutation from a previous block, modifying the at least one state variable for a final permutation by an output of the first pseudorandom permutation from the previous block and the at least one state variable for the first pseudorandom permutation from the current block, and modifying the at least one state variable for all other pseudorandom permutations by an output of a preceding pseudorandom permutation from the previous block.

The computer readable medium comprises instructions for initializing the at least one state variable before encrypting a first plaintext block by randomizing a nonce, modifying the input to a pseudorandom permutation by an internal counter, generating an authentication tag from a combination of the state variables, generating at least one ciphertext block from an output of each plaintext block's final pseudorandom permutation, wherein the pseudorandom permutations are at least one of: block ciphers, keyed substitution tables, S-Boxes, and rotors.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the elements. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a wireless source, and a wired source and via plurality of protocols.

What is claimed is:

1. An apparatus for encrypting a plaintext message, comprising:
    a memory for storing at least one state variable; and
    a processor coupled to the memory, the processor configured to:
        receive at least one plaintext message, wherein the plaintext message forms at least one plaintext block;
        encrypt said plaintext block by applying 2 or more pseudorandom permutations to each block;
        modify an input to each said pseudorandom permutation by the at least one state variable which is modified for each plaintext block by at least one of previously generated permutation outputs, previously generated permutation inputs, ciphertext, and plaintext;
        partition the plaintext message into a plurality of equal size plaintext blocks; and
        pad the plaintext message to facilitate the equal sized plaintext blocks.

2. An apparatus for encrypting a plaintext message, comprising:
    a memory for storing at least one state variable: and
    a processor coupled to the memory, the processor configured to:
        receive at least one plaintext message, wherein the plaintext message forms at least one plaintext block;
        encrypt said plaintext block by applying 2 or more pseudorandom permutations to each block; and
        modify an input to each said pseudorandom permutation by the at least one state variable which is modified for each plaintext block by at least one of previously generated permutation outputs, previously generated permutation inputs, ciphertext, and plaintext;
    wherein the modification of the state variables comprises at least one of:
        modifying the state variable for a first pseudorandom permutation by an output of a next to the last pseudorandom permutation from the previous block;
        modifying the state variable for a final permutation by an output of the first pseudorandom permutation from the previous block and the state variable for the first pseudorandom permutation from the current block; and
        modifying the state variables for all other pseudorandom permutations by an output of the preceding pseudorandom permutation from the previous block.

3. The apparatus of claim 2, wherein the state variables are modified using at least one of modular $2^n$ addition and modular $2^n$ subtraction wherein n represents the size of a block.

4. The apparatus of claim 2, wherein the state variables are modified using a bitwise exclusive or (XOR).

5. An apparatus for encrypting a plaintext message, comprising:
    a memory for storing at least one state variable; and
    a processor coupled to the memory, the processor configured to:
        receive at least one plaintext message, wherein the plaintext message forms at least one plaintext block;
        encrypt said plaintext block by applying 2 or more pseudorandom permutations to each block;
        modify an input to each said pseudorandom permutation by the at least one state variable which is modified for each plaintext block by at least one of previously generated permutation outputs, previously generated permutation inputs, ciphertext, and plaintext; and
    an initializer for initializing the state variables before encrypting the first plaintext block by randomizing a nonce.

6. The apparatus of claim 5, wherein the processor is further configured to pad the nonce in order to facilitate the initialization of the state variables.

7. The apparatus of claim 5, wherein the initialized state variables are unique from other initialized state variables in a context of a session key.

8. An apparatus for encrypting a plaintext message, comprising:
    a memory for storing at least one state variable; and
    a processor coupled to the memory, the processor configured to:
        receive at least one plaintext message, wherein the plaintext message forms at least one plaintext block;
        encrypt said plaintext block by applying 2 or more pseudorandom permutations to each block; and
        modify an input to each said pseudorandom permutation by the at least one state variable which is modified for each plaintext block by at least one of previously generated permutation outputs, previously generated permutation inputs, ciphertext, and plaintext;

wherein the number of pseudorandom permutations determines the number of state variables.

9. An apparatus for encrypting a plaintext message, comprising:
a memory for storing at least one state variable; and
a processor coupled to the memory, the processor configured to:
receive at least one plaintext message, wherein the plaintext message forms at least one plaintext block;
encrypt said plaintext block by applying 2 or more pseudorandom permutations to each block; and
modify an input to each said pseudorandom permutation by the at least one state variable which is modified for each plaintext block by at least one of previously generated permutation outputs, previously generated permutation inputs, ciphertext, and plaintext;
wherein each pseudorandom permutation is keyed by at least one different key.

10. An apparatus for encrypting a plaintext message, comprising:
a memory for storing at least one state variable; and
a processor coupled to the memory, the processor configured to:
receive at least one plaintext message, wherein the plaintext message forms at least one plaintext block;
encrypt said plaintext block by applying 2 or more pseudorandom permutations to each block; and
modify an input to each said pseudorandom permutation by the at least one state variable which is modified for each plaintext block by at least one of previously generated permutation outputs, previously generated permutation inputs, ciphertext, and plaintext;
wherein a portion of the pseudorandom permutations may be substituted for the inverses of a remaining portion of the pseudorandom permutations.

11. The apparatus of claim 10, wherein the pseudorandom permutations and inverse pseudorandom permutations may be arranged in any order.

12. An apparatus for encrypting a plaintext message, comprising:
a memory for storing at least one state variable; and
a processor coupled to the memory, the processor configured to:
receive at least one plaintext message, wherein the plaintext message forms at least one plaintext block;
encrypt said plaintext block by applying 2 or more pseudorandom permutations to each block;
modify an input to each said pseudorandom permutation by the at least one state variable which is modified for each plaintext block by at least one of previously generated permutation outputs, previously generated permutation inputs, ciphertext, and plaintext; and
generate an authentication tag from a combination of the state variables.

13. The apparatus of claim 12, wherein the processor generates the authentication tag by concatenating the resulting state variables after the encryption of the final plaintext block.

14. The apparatus of claim 12, wherein the processor generates the authentication tag by concatenating the resulting state variables after the encryption of a chosen plaintext block.

15. The apparatus of claim 12, wherein the processor generates the authentication tag by concatenating the resulting state variables after the encryption of the final plaintext block, concatenating the initial state variables, and combining the two sets of concatenated variables through an exclusive or (XOR).

16. The apparatus of claim 12, wherein the processor is further configured to attach the authentication tag to a ciphertext message.

17. The apparatus of claim 12, wherein the number of state variables determines the size of the authentication tag.

18. An apparatus for encrypting a plaintext message, comprising:
a memory for storing at least one state variable: and
a processor coupled to the memory, the processor configured to:
receive at least one plaintext message, wherein the plaintext message forms at least one plaintext block;
encrypt said plaintext block by applying 2 or more pseudorandom permutations to each block;
modify an input to each said pseudorandom permutation by the at least one state variable which is modified for each plaintext block by at least one of previously generated permutation outputs, previously generated permutation inputs, ciphertext, and plaintext; and
modify the input to a pseudorandom permutation by at least one counter.

19. The apparatus method of claim 18, wherein the processor is further configured to initialize the counters before encrypting the first plaintext block by randomizing a nonce.

20. An apparatus for encrypting a plaintext message, comprising:
logic to form at least one nonce block from at least one nonce;
memory to store at least one state variable;
an initializer to set the at least one state variable to at least one initial value;
wherein the logic is coupled to the memory and to the initializer;
wherein the logic includes at least two pseudorandom permutations to sequentially randomize each nonce block;
wherein the logic combines the at least one state variable with inputs to the pseudorandom permutations; and
wherein the logic generates the at least one state variable of a current nonce block from at least one of: state variables of a previous nonce block, outputs from the previous nonce block's pseudorandom permutations, and inputs to the previous nonce block's pseudorandom permutations.

21. The apparatus of claim 20, wherein the memory stores outputs of final pseudorandom permutations as initial values to use in an encryption or decryption.

22. The apparatus of claim 20, wherein the memory stores final state variables as initial values for use in an encryption or decryption.

23. The apparatus of claim 20, wherein the logic adds at least one bit of padding to the nonce to generate equal sized nonce blocks.

24. The apparatus of claim 20, wherein the number of pseudorandom permutations is equal to the number of nonce blocks and the number of state variables.

25. The apparatus of claim 20, wherein the pseudorandom permutations are at least one of: block ciphers, keyed substitution tables, S-Boxes, and rotors.

26. The apparatus of claim 20, wherein a portion of the pseudorandom permutations may be substituted for inverses of a remaining portion of the pseudorandom permutations.

* * * * *

UNITED STATES PATENT AND TRADEMARK OFFICE
CERTIFICATE OF CORRECTION

| | |
|---|---|
| PATENT NO. | : 7,715,553 B2 |
| APPLICATION NO. | : 11/496214 |
| DATED | : May 11, 2010 |
| INVENTOR(S) | : Smith et al. |

Page 1 of 1

It is certified that error appears in the above-identified patent and that said Letters Patent is hereby corrected as shown below:

Claim 2, line 67, replace ":" with ";"

Claim 18, line 11, replace ":" with ";"

Claim 19, line 25, delete "method"

Signed and Sealed this

Thirty-first Day of August, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,715,553 B2 | Page 1 of 1 |
| APPLICATION NO. | : 11/496214 | |
| DATED | : May 11, 2010 | |
| INVENTOR(S) | : Smith et al. | |

It is certified that error appears in the above-identified patent and that said Letters Patent is hereby corrected as shown below:

Claim 2, Column 13, line 67, replace ":" with ";"

Claim 18, Column 16, line 11, replace ":" with ";"

Claim 19, Column 16, line 25, delete "method"

This certificate supersedes the Certificate of Correction issued August 31, 2010.

Signed and Sealed this

Twenty-eighth Day of September, 2010

David J. Kappos
*Director of the United States Patent and Trademark Office*